US007668876B1

(12) United States Patent
Kulkarni (10) Patent No.: US 7,668,876 B1
(45) Date of Patent: Feb. 23, 2010

(54) SNAPSHOT-BASED REPLICATION INFRASTRUCTURE FOR EFFICIENT LOGGING WITH MINIMAL PERFORMANCE EFFECT (75) Inventor: Pradip Madhukar Kulkarni, Maharashtra (IN)

(73) Assignee: Symantec Operating Corporation, Mountain View, CA (US)

( * ) Notice: Subject to any disclaimer, the term of this patent is extended or adjusted under 35 U.S.C. 154(b) by 429 days.

(21) Appl. No.: 10/423,291

(22) Filed: Apr. 25, 2003

(51) Int. Cl.
  *G06F 17/30* (2006.01)
(52) U.S. Cl. ..................... 707/204; 707/202
(58) Field of Classification Search ............... 719/318; 709/200; 711/117, 148; 707/204, 100, 200, 707/104.1, 202
  See application file for complete search history.

(56) References Cited

U.S. PATENT DOCUMENTS

| | | | | |
|---|---|---|---|---|
| 5,408,630 | A * | 4/1995 | Moss | 711/112 |
| 5,504,888 | A * | 4/1996 | Iwamoto et al. | 707/200 |
| 6,594,745 | B2 * | 7/2003 | Grover | 711/162 |
| 6,785,786 | B1 * | 8/2004 | Gold et al. | 711/162 |
| 6,804,819 | B1 * | 10/2004 | Bates et al. | 719/318 |
| 7,082,446 | B1 * | 7/2006 | Bottomley | 707/204 |
| 2002/0087588 | A1 * | 7/2002 | McBride et al. | 707/204 |
| 2002/0156987 | A1 * | 10/2002 | Gajjar et al. | 711/203 |
| 2003/0028509 | A1 * | 2/2003 | Sah et al. | 707/1 |
| 2004/0059869 | A1 * | 3/2004 | Orsley | 711/114 |
| 2007/0219950 | A1 * | 9/2007 | Crawford | 707/2 |

OTHER PUBLICATIONS

Sun Microsysem, "Veritas File System Administrator's Guide, Release 3.3.2", May 1999, P-1-188. Retrieved from the Internet:<URL: http://www.filibeto.org/sun/lib/nonsun/veritas/vxfs/3.3.2/fs332_quickstart_236569.pdf>.*
Tweedie, Stephen, "Journaling the Linux ext2fs File System", LinuxExpo 1998, P-1-8. Retrieved from the Internet:<URL: http://jamesthornton.com/hotlist/linux-filesystems/ext3-journal-design.pdf>.*

* cited by examiner

*Primary Examiner*—Jean B. Fleurantin
*Assistant Examiner*—Dennis Myint
(74) *Attorney, Agent, or Firm*—Campbell Stephenson LLP (57) ABSTRACT A method, system, computer system, and computer program product to provide an infrastructure for replicating data across multiple nodes in a network. Changes to data are written to each of a set of mirrored copies of a log on one node. When a storage area containing a portion of one of the mirrored copies of the log becomes full, the storage area is disassociated from the set of mirrored copies. After detaching the storage area, changes are no longer written to the storage area, thereby providing a stable image of that portion of the log data. Log data stored in the storage area are replicated from the storage area to another node. By replicating from a separate detached storage area, log data are replicated without disturbing the disk heads writing changes to each of the set of mirrored copies of the log.

15 Claims, 6 Drawing Sheets

SNAPSHOT-BASED REPLICATION INFRASTRUCTURE FOR EFFICIENT LOGGING WITH MINIMAL PERFORMANCE EFFECT

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

Information drives business. For businesses which increasingly depend on such information for their day-to-day operations, improving the accessibility and usability of data and preventing or quickly recovering from unexpected downtime caused by data loss or corruption are of paramount importance. After the terrorist attacks on the World Trade Center and Pentagon on Sep. 11, 2001, disaster recovery has received heightened emphasis in the business-critical resource planning process, and replication of business critical information has become a top priority. As business data grows, replication of the business data consumes increasing amounts of time of information technology workers, as well as bandwidth on production servers. Replication infrastructures can become very complex to construct and manage.

To increase data accessibility and usability and to minimize the impact of data corruption and loss, a number of techniques have been developed and implemented. One such technique involves the creation of one or more "mirror" copies of data.

Mirrored data is typically generated by duplicating data and update operations (e.g., write operations) from a primary data storage area to a mirror or "replicated" storage area in real time as updates are made to primary data. Such duplication may be performed by software (e.g., a volume manager, operating system, file system, etc.) or hardware (e.g., a storage device controller). The mirrored data may then be used to facilitate failover recovery, load balancing, and/or to generate frozen images (e.g., snapshots) used in performing various on-host and off-host processing functions (e.g., backups, data analysis, etc.). A snapshot is typically generated by "detaching" a mirror being updated in real time so that it is no longer updated. Detaching the mirror involves halting transactions being applied to the primary data storage area and to the mirror for a very brief time period to allow existing transactions to complete. A snapshot is then taken, which serves as a frozen or "point-in-time" image and provides a logically consistent copy of the primary data.

Figure 1A:
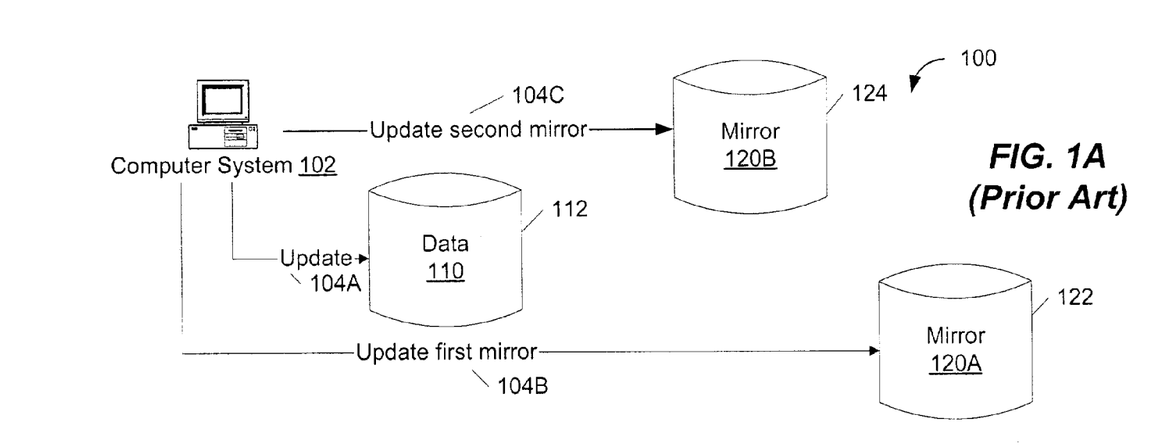
FIG. 1A shows production data being backed up to two mirrors.
Figure 1B:
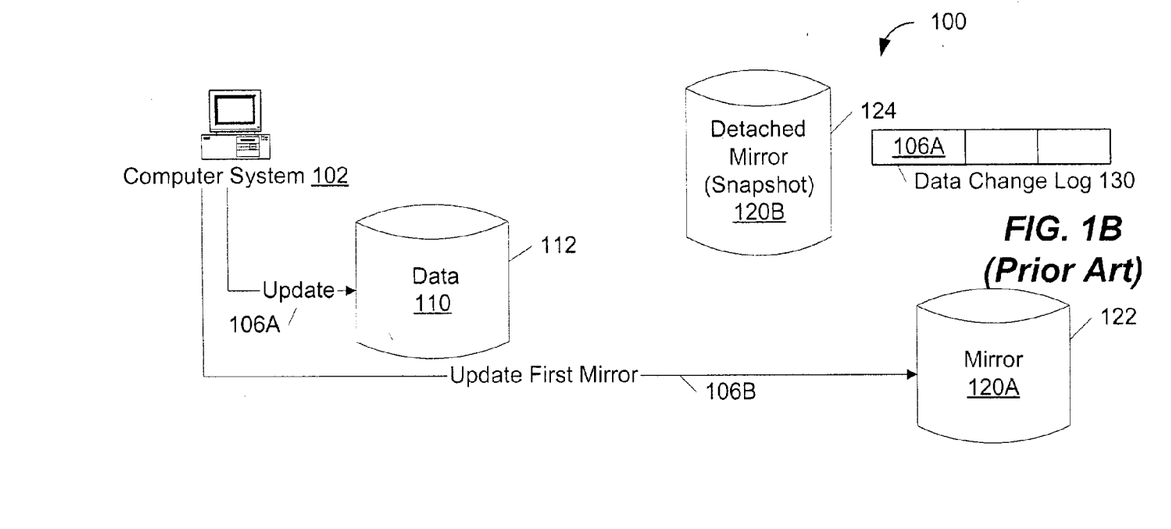
FIG. 1B shows detaching a mirror from a primary file set to produce a snapshot.
Figure 1C:
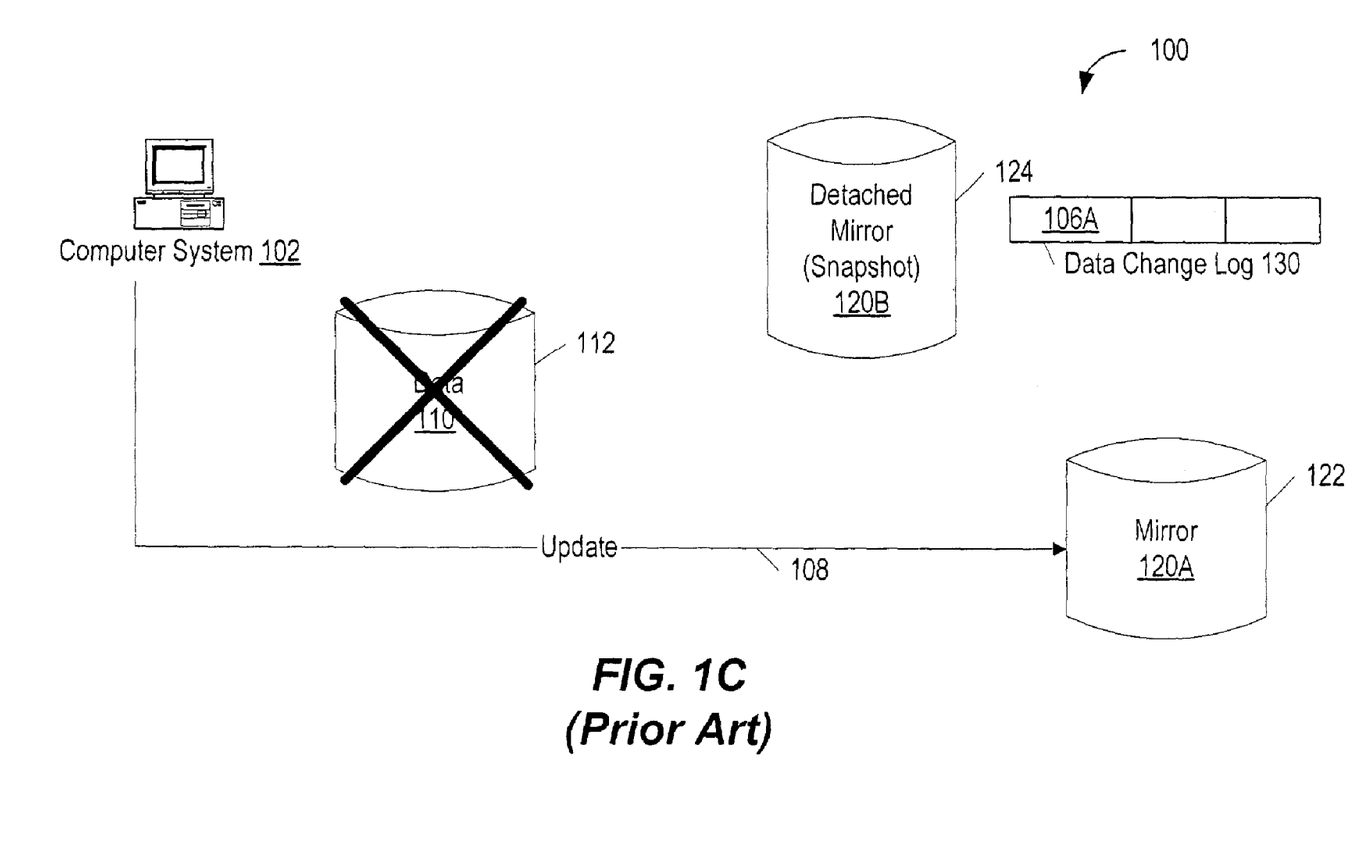
FIG. 1C shows mirrors being used to facilitate failover recovery and provide consistent access to a frozen image of a primary set of data.

FIGS. 1A-1C illustrate the generation and use of data mirrors according to the prior art. In FIG. 1A, two mirrors of data 110 are maintained within a storage environment 100, and corresponding updates are made to mirrors 120A and 120B when an update, such as update 104A, is made to data 110. For example, update 104B is made to mirror 120A residing on mirror data storage area 122, and corresponding update 104C is made to mirror 120B residing on mirror data storage area 124 when update 104A is made to data 110. In a conventional data storage system, each mirror resides on a separate physical storage device from the data for which the mirror serves as a backup, and therefore, data storage areas 112, 122, and 124 may represent three physical storage devices.

A snapshot of data can then be made by "detaching," or "splitting," a mirror of the data so that the mirror is no longer being updated. FIG. 1B shows storage environment 100 after detaching mirror 120B. Detached mirror (snapshot) 120B serves as a snapshot of data 110 as it appeared at the point in time that mirror 120B was detached. When another update 106A is made to data 110, a corresponding update 106B is made to mirror 120A. However, no update is made to detached mirror (snapshot) 120B. Instead, a pointer to the data changed in update 106A is retained in a data change log 130, which tracks changes in primary data with respect to detached mirror (snapshot) 120B.

In a typical data storage system, resynchronization allows snapshots to be refreshed and re-used rather than discarded. A snapshot such as snapshot 120B can be quickly re-associated with the primary data which it previously mirrored in a process sometimes referred to as a "snapback." Updates made to the primary volume while the snapshot was unavailable for update are tracked using data change log 130. When the snapshot is "re-attached" to again serve as a mirror, only the updates that were missed are applied to re-synchronize the snapshot with the primary data. For example, if the storage device storing detached mirror (snapshot) 120B will be again used to serve as a mirror for production data, an update applying the change made in update 106A would be applied to snapshot 120B before other updates are made.

In FIG. 1C, mirrors (e.g., mirror 120A and detached mirror 120B) are used to facilitate failover recovery and provide consistent access to a frozen image of primary data 110. Following a failure of storage area 112 after which data 110 is no longer accessible, mirror 120A residing on mirror data storage area 122 may be used in place of primary data 110 to ensure the availability of data stored within storage environment 100. Updates (e.g., update 108) are subsequently performed on mirror 120A with no corresponding updates being done on data 110 (which is inaccessible due to failure) or detached mirror 124 (which is being maintained as a read-only, point-in-time image of primary data 110).

While the failover recovery technique may be used to provide access to both point-in-time and real-time or "live" images of primary data following the failure of an associated storage area, it requires the creation and maintenance of at least one duplicate mirror of primary data. Conventional storage environments may include additional mirrors to avoid dependency on a single data mirror in the event of such a failure, thereby increasing the amount of resources necessary to provide such functionality. Consequently, using mirrors for failover and disaster recovery has some undesirable characteristics.

While snapshot technology enables point-in-time images of data to be maintained on a single node, replicating the data to different nodes for disaster recovery purposes introduces another level of complexity. Storage space must be managed at multiple sites, and large amounts of data must be transferred across a network without disrupting the business activities of the organization or degrading performance of business-critical systems. Complex storage configurations on one node require corresponding complex storage configurations on replication nodes.

What is needed is a system that efficiently replicates data shared by multiple nodes without degrading the performance of the application writing the data.

SUMMARY OF THE INVENTION

A method, system, application programming interface, computer system and computer program product to provide an infrastructure for replicating data across multiple nodes in a network. Changes to data are written to a log, wherein the log comprises a set of mirrored copies of log data on one node. Each change is written to each mirrored copy of the log. When a storage area containing a portion of one of the mirrored copies of the log becomes full, the storage area is "detached," or disassociated, from the set of mirrored copies. After detaching the storage area, changes are no longer written to the storage area, thereby providing a stable image of that portion of the log data. Log data stored in the storage area are then replicated from the storage area to another node. By replicating from a separate detached storage area, log data are replicated without disturbing the disk heads writing changes to each of the set of mirrored copies of the log.

When the replication is complete, the storage area can be added back to store the set of mirrored copies, or the storage area can be added to a free pool from which storage resources are obtained as needed. As a complete mirrored copy of the log is replicated, storage areas are recycled from the free pool and/or reused as storage devices within the mirrors to ensure continuous logging of changes to data.

This form of replication enables log data to be read from a stable copy of the log dedicated to providing log data for reading. Log data are written to a copy of the log dedicated to receiving continuous updates to log data. The head positions on the logging disks are not disturbed because reads do not intermingle with writes. This approach provides ideal logging conditions that tolerate minimal, if any, delays to access data and achieve sequential input/output (I/O) accesses on data logging. Snapshot technology can be used to minimize I/O delays in the application, and including snapshot functionality in a replication appliance can produce an efficient, shared and scalable data replication engine.

BRIEF DESCRIPTION OF THE DRAWINGS

The present invention may be better understood, and its numerous features and advantages made apparent to those skilled in the art by referencing the accompanying drawings.

The use of the same reference symbols in different drawings indicates similar or identical items.

DETAILED DESCRIPTION

For a thorough understanding of the subject invention, refer to the following Detailed Description, including the appended Claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

INTRODUCTION

The present invention efficiently replicates logs of changes to data shared by nodes in a multi-node environment. Very efficient logging and snapshots are integrated with a replication appliance capable of replicating file level, block level, and/or disk level copies of data. The replication infrastructure, combined with storage area management functionality, centralizes replication services in a Storage Area Network.

In a mirroring environment such as that described in FIGS. 1A through 1C, often a log is used to track changes made to data to facilitate recovery in the event of a system failure. This log identifies regions of data that are being updated as the update occurs. If a system failure occurs during the update, the log identifies regions that were being changed so that only those regions can be synchronized to restore consistency between the mirrored copies of data. It is not necessary to make a complete copy of the data to synchronize the mirrored copies of the data. When the given update is successfully completed, the log can be cleared, indicating that those regions are no longer targeted for update.

Rather than replicating a complete set of mirrored data to each node during a given replication cycle, typically an initial set of data is replicated to each node, and thereafter, only data corresponding to entries in the log are replicated. To maintain consistency of the mirrored copies, changes to the data are written to the log in the same order on each node. To replicate the log, a replication program reads the log to identify the data to be replicated, and then replicates the data from one node to another.

This form of replication, which intermingles reads and writes to the log, disturbs the head positions on the logging disks. If a large number of changes to data are being made, this form of replication can result in head thrashing and significant delays in production application I/O accesses.

Ideal logging conditions tolerate minimal, if any, delays to access data and achieve sequential I/O accesses on data logging. Snapshot technology can be used to minimize I/O delays in the application, and including snapshot functionality in a replication appliance can produce an efficient, shared and scalable data replication engine.

Figure 2:
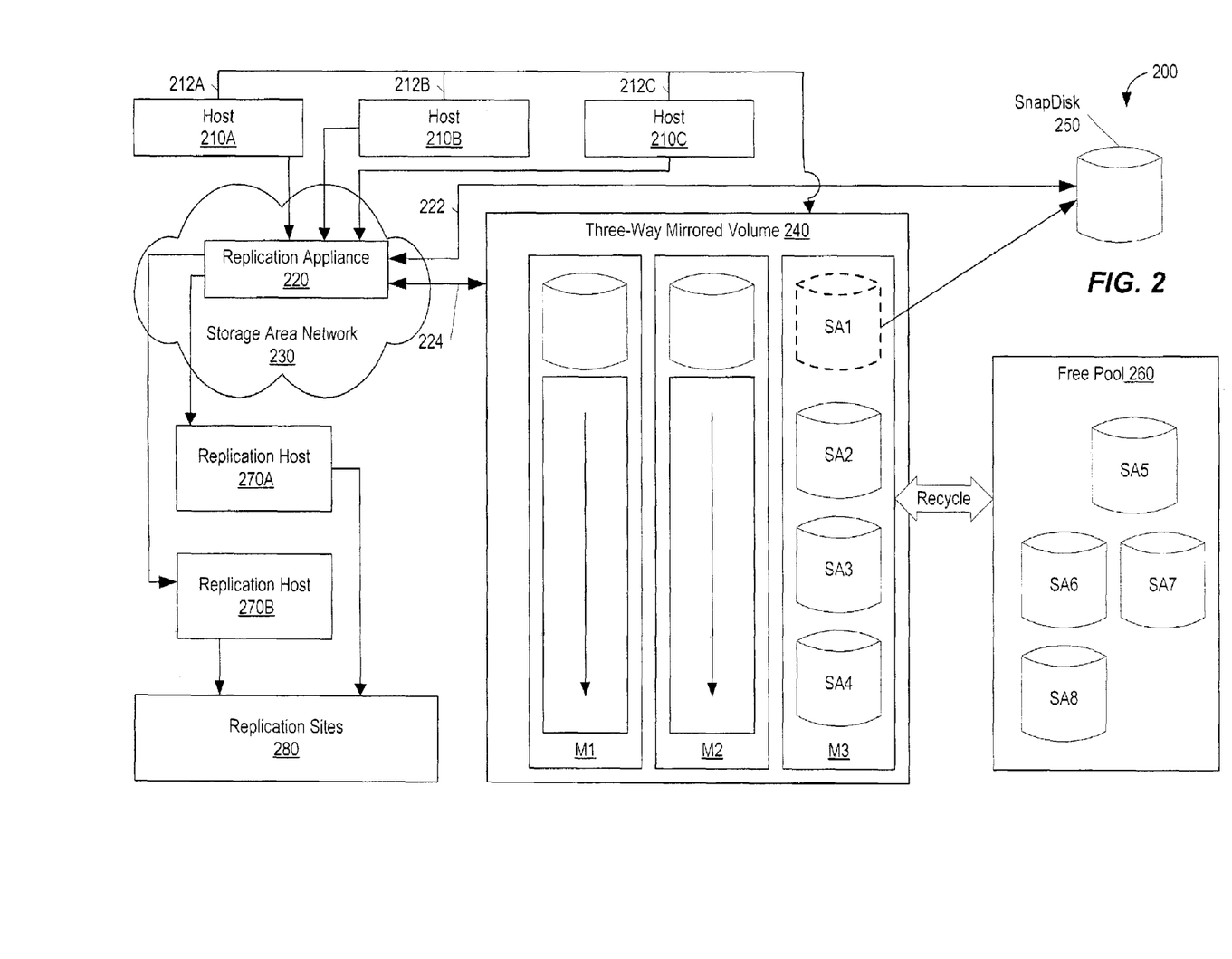
FIG. 2 shows an example embodiment of a replication infrastructure using snapshots in accordance with the present invention.

FIG. 2 shows an example embodiment of a replication infrastructure 200 using snapshots in accordance with the present invention. Hosts 210A, 210B, and 210C manage application data and store log data as a set of mirrored copies of the log. In the embodiment shown in FIG. 2, the set of mirrored copies is illustrated by three-way mirrored volume 240. Each of hosts 210A, 210B, and 210C stores log data in three-way mirrored volume 240 via a respective connection 212A, 212B, or 212C. Software and/or hardware modules on each of hosts 210A, 210B, and 210C write changes to a set of data to a log and can be referred to as a writing module, means, or instructions.

Replication appliance 220 resides in a storage area network 230. In the embodiment shown, replication appliance 220 uses replication hosts 270A and 270B to replicate data to replication sites 280. One of skill in the art will understand that replication hosts are not necessary to operation of the invention, and that replication appliance 220 may directly replicate data to replication sites 280. Replication appliance 220, operating with or without replication hosts 270A and 270B, can be considered to be a replication module, means, or instructions.

One of skill in the art will understand that three-way mirrored volume 240 is only an example embodiment of the log stored as a set of mirrored copies. The log may have only two mirrors, or the log may have more than three mirrors. Preferably, the log has at least three mirrors, as shown in three-way mirrored volume 240 mirrors M1, M2, and M3. Three mirrors allow one mirror to serve as the primary copy of the data, a second mirror to store a duplicate of the primary data for purposes of reliability, and the third mirror to be detached and used for replication.

The third mirror M3 is constructed from several storage areas, including storage areas SA1, SA2, SA3, and SA4, which correspond to physical disk spindles in one embodiment. The storage areas are obtained to form mirror M3 from a free pool 260, with additional storage areas, such as storage areas SA5, SA6, SA7, and SA8 in free pool 260 remaining unused. As indicated by the "recycle" arrow between three-way mirrored volume 240 and free pool 260, storage areas can be recycled to be used as storage for a portion of the mirror used for replicating data.

After becoming full, storage area SA1 is detached from the set of storage areas in mirror M3 to form snap disk 250. Detaching a storage area, as described with reference to FIGS. 1B and 1C above, includes discontinuing writes of subsequent changes to the storage area and disassociating the storage area from the set of mirrored copies of the data. Detaching a storage area avoids disturbance of further log write activity by allowing data to be read from the detached storage area for replicating the data in the storage area, rather than from the set of mirrored copies of the data. Disk head thrashing is eliminated and application I/O delays are minimized. The functionality for detaching a storage area can be described as a detaching or disassociating module, means, or instructions, and may be part of three-way mirrored volume 240 and/or controlled by replication appliance 220.

After being detached, snap disk 250 is not updated as subsequent updates to mirror M3 are made. Snap disk 250 serves as a stable copy of data on three-way mirrored volume 240 from which log data can be replicated. As logging to mirror M3 proceeds, other storage areas of mirror M3, such as storage areas SA2, SA3, and SA4, can be detached one by one, holding the contents for replication.

As shown by the arrows in mirrors M1 and M2, data are written to each mirrored copy from beginning to end in sequential order. Similarly, in mirror 3, storage areas SA1 through SA4 are sequentially written, with each storage area becoming full before data are written to the next storage area.

When logging completes one full cycle such that a complete copy of the mirror, in this case M3, is made, the detached storage area, here snap disk 250, is checked to determine whether all of its contents have been successfully sent to remote replication sites 280. If the contents have been successfully replicated, then the detached storage area SA1 is attached back to its original logical offset in the three-way mirrored volume 240. Mirrored log writes continue as parallel writes to three mirrors. The functionality for re-attaching a detached storage area can be described as an adding module, means or instructions.

If some of the contents of snap disk 250 are still pending completion of replication, another storage area is chosen from free pool 260 to attach to the position previously occupied by storage area SA1 in three-way mirrored volume 240. This approach enables logging to be resumed as quickly as possible to three mirrors, without the application having to wait for log entries to be cleared and without a fear of overwriting log entries. The functionality for adding a storage area from the free pool can be described as an adding module, means or instructions.

Storage areas continue recycling to free pool 260 as their contents are entirely replicated to remote sites. Storage areas can then be returned to a mirror to store mirrored copies of log data until logging again fills the storage area. The size of free pool 260 is governed by the parity between the rate of data transfer to remote replication sites 280 and the rate of I/O generation by hosts 210A, 210B, and 210C sharing replication appliance 220.

In one embodiment, replication appliance 220 is a commercially available product, such as VERITAS SAN-box (block server) produced by Veritas Software Corporation of Mountain View, Calif. In this embodiment, replication appliance 220 exports a single device node (not shown) to hosts 210A, 210B and 210C as a logging device. A single replication appliance shared among several production hosts reduces management overhead and associated costs.

Production hosts 210A, 210B, and 210C use the exported device for sending I/O to remote replication sites 280. Replication appliance 220 accesses snap disk 250 via connection 222 and three-way mirrored volume 240 via connection 224 and provides pointers to the data to be replicated to replication hosts 270A and 270B.

Figure 3:
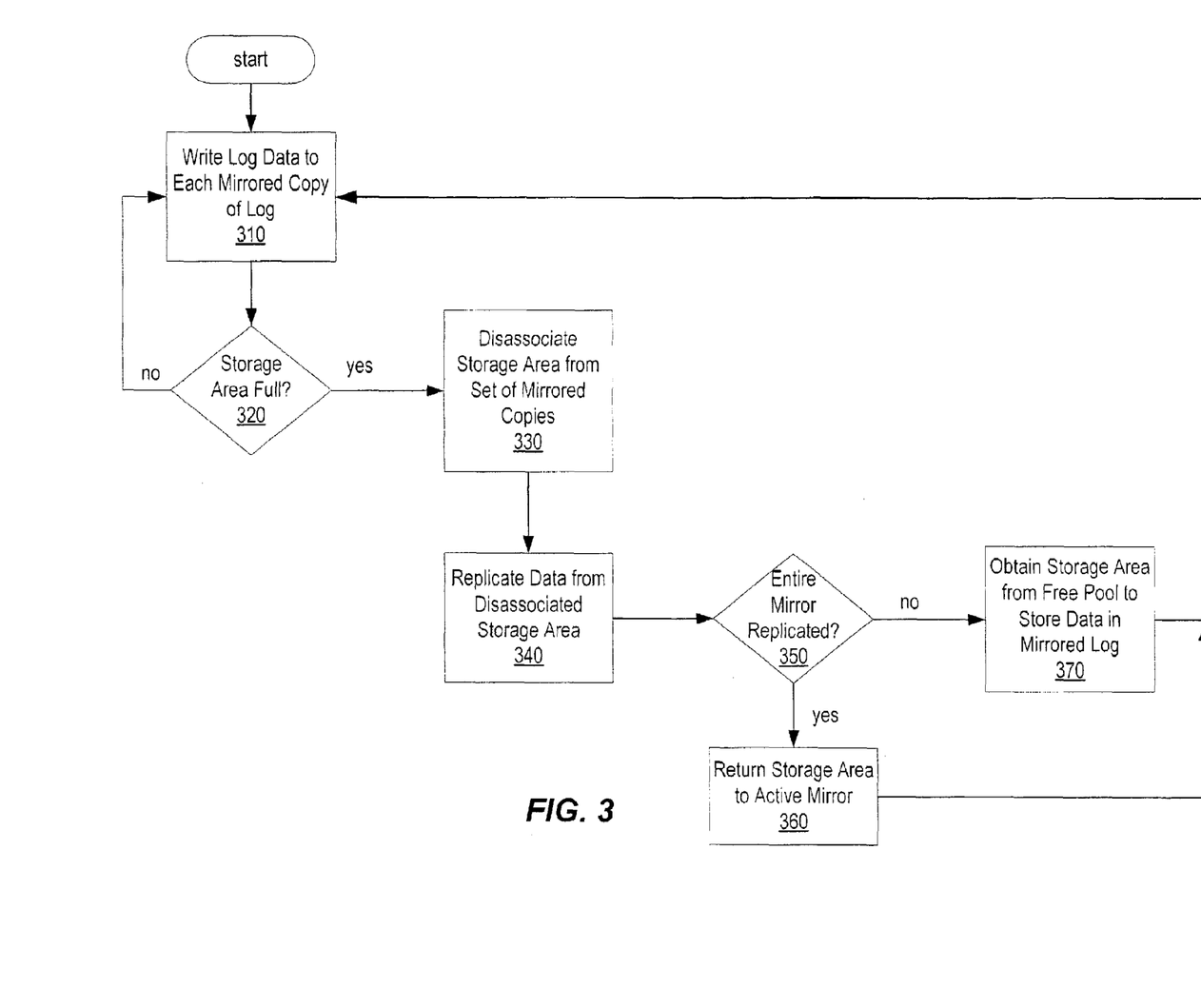
FIG. 3 is a flowchart of data flowing through a system using snapshot-based replication for efficient logging.

FIG. 3 is a flowchart showing data flowing through a system using snapshot-based replication for efficient logging. In "Write Log Data to Each Mirrored Copy of Log" step 310, data are written in parallel to each mirrored copy of the data. For example, data can be written to primary data, to a second mirror for reliability purposes, and to a third mirror for replication. At "Storage Area Full" decision point 320, a determination is made whether a storage area storing a portion of the log in the mirror for replicating data is full. For example, as data are continuously written to data in "Write Log Data to Each Mirrored Copy of Log" step 310, the storage area to which data are currently being written can become full. If the storage area currently being written is not full, control returns to "Write Log Data to Each Mirrored Copy of Log" step 310, where data are written to the mirrored copies of the log.

If the storage area currently being written in the replication mirror is full at "Storage Area Full" decision point 320, control proceeds to "Disassociate Storage Area from Set of Mirrored Copies" step 330. In this step, the storage area is disassociated from the set of mirrored copies so that subsequent writes to the log are not written to the storage area. This disassociation and discontinuance of writing data to this copy of the log is also referred to as "detaching" a portion of the mirror from the log. Control then proceeds to "Replicate Data from Disassociated Storage Area" step 340, where data from the disassociated storage area provide a stable copy of the log that can be replicated to other nodes.

When replication is complete, control proceeds from "Replicate Data from Disassociated Storage Area" step 340 to "Entire Mirror Replicated" decision point 350. If the entire mirror has been replicated, including the storage area just detached for replication, control proceeds to "Return Storage Area to Active Mirror" step 360, where the storage area is attached back to its original logical offset in the mirrored log, such as SA1 in three-way mirrored volume 240 of FIG. 2.

If the contents of the entire mirror have not been replicated at "Entire Mirror Replicated" decision point 350, control proceeds to "Obtain Storage Area from Free Pool to Store Data in Mirrored Log" step 370. This new storage area is used to log data, for example, when the data from storage area SA1 have not completed replication and storage area SA4 becomes full and replication of the data completes. Log data can continue to be written to three mirrors using the new storage area while storage area SA1 continues to be replicated.

Any object, such as a file, volume or disk, can be replicated by replication appliance 220. The object type information can be stored in a control section of the I/O packet followed by data to be replicated, as defined in a log entry definition. In one embodiment, replication appliance 220 exports a logging device as a fiber channel/SCSI device. In this embodiment, logging provides very low latency storage due to the undisturbed flow of writes that would otherwise occur in conventional logging devices. By careful use of such features as mirroring and striping, where data are spread across several disks, in the logging device, very high bandwidth storage can be achieved in a multi-host environment in which the hosts share data.

By deploying the replication infrastructure 200 at the remote sites, such as at replication sites 280, a transparent mechanism of replication can be achieved and numerous host cycles can be saved. During file level replication in a clustering environment, remote replication sites 280 can deploy a clustering file system product to apply file-level changes at the remote replication sites 280.

Using the present invention, replication technologies scattered among products can be consolidated to provide a single point of replication for a variety of objects such as files, disks, and volumes. Re-use of available component technologies enables high performance, scalable, shared appliances to be created for complex environments.

Replication of data logs using snapshots can be implemented in a multi-node environment using a variety of computer systems and networks. An example of one such computing and network environment is described below with reference to FIGS. 4 and 5.

An Example Computing and Network Environment

Figure 4:
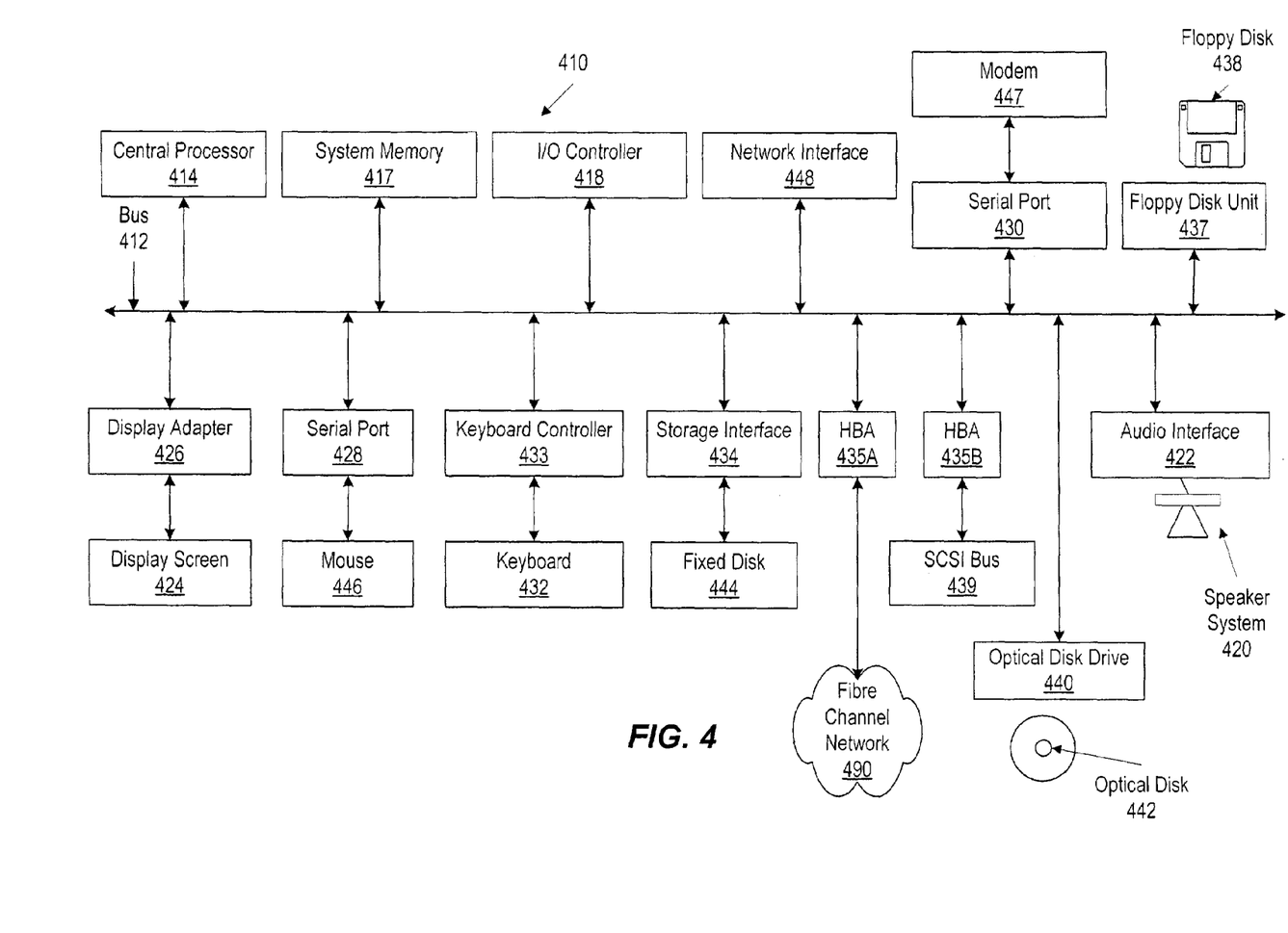
FIG. 4 is a block diagram illustrating a computer system suitable for implementing embodiments of the present invention.

FIG. 4 depicts a block diagram of a computer system 410 suitable for implementing the present invention. Computer system 410 includes a bus 412 which interconnects major subsystems of computer system 410, such as a central processor 414, a system memory 417 (typically RAM, but which may also include ROM, flash RAM, or the like), an input/output controller 418, an external audio device, such as a speaker system 420 via an audio output interface 422, an external device, such as a display screen 424 via display adapter 426, serial ports 428 and 430, a keyboard 432 (interfaced with a keyboard controller 433), a storage interface 434, a floppy disk drive 437 operative to receive a floppy disk 438, a host bus adapter (HBA) interface card 435A operative to connect with a fibre channel network 490, a host bus adapter (HBA) interface card 435B operative to connect to a SCSI bus 439, and an optical disk drive 440 operative to receive an optical disk 442. Also included are a mouse 446 (or other point-and-click device, coupled to bus 412 via serial port 428), a modem 447 (coupled to bus 412 via serial port 430), and a network interface 448 (coupled directly to bus 412).

Bus 412 allows data communication between central processor 414 and system memory 417, which may include read-only memory (ROM) or flash memory (neither shown), and random access memory (RAM) (not shown), as previously noted. The RAM is generally the main memory into which the operating system and application programs are loaded and typically affords at least 66 megabytes of memory space. The ROM or flash memory may contain, among other code, the Basic Input-Output system (BIOS) which controls basic hardware operation such as the interaction with peripheral components. Applications resident with computer system 410 are generally stored on and accessed via a computer readable medium, such as a hard disk drive (e.g., fixed disk 444), an optical drive (e.g., optical drive 440), floppy disk unit 437 or other storage medium. Additionally, applications may be in the form of electronic signals modulated in accordance with the application and data communication technology when accessed via network modem 447 or interface 448.

Storage interface 434, as with the other storage interfaces of computer system 410, may connect to a standard computer readable medium for storage and/or retrieval of information, such as a fixed disk drive 444. Fixed disk drive 444 may be a part of computer system 410 or may be separate and accessed through other interface systems. Modem 447 may provide a direct connection to a remote server via a telephone link or to the Internet via an internet service provider (ISP). Network interface 448 may provide a direct connection to a remote server via a direct network link to the Internet via a POP (point of presence). Network interface 448 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 4 to be present to practice the present invention. The devices and subsystems may be interconnected in different ways from that shown in FIG. 4. The operation of a computer system such as that shown in FIG. 4 is readily known in the art and is not discussed in detail in this application. Code to implement the present invention may be stored in computer-readable storage media such as one or more of system memory 417, fixed disk 444, optical disk 442, or floppy disk 438. Additionally, computer system 410 may be any kind of computing device, and so includes personal data assistants (PDAs), network appliance, X-window terminal or other such computing devices. The operating system provided on computer system 410 may be MS-DOS®, MS-WINDOWS®, OS/2®, UNIX®, Linux®, or another known operating system. Computer system 410 also supports a number of Internet access tools, including, for example, an HTTP-compliant web browser having a JavaScript interpreter, such as Netscape Navigator®, Microsoft Explorer®, and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 410). It is to be understood that such depicted architectures are merely examples, and that, in fact, many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Figure 5:
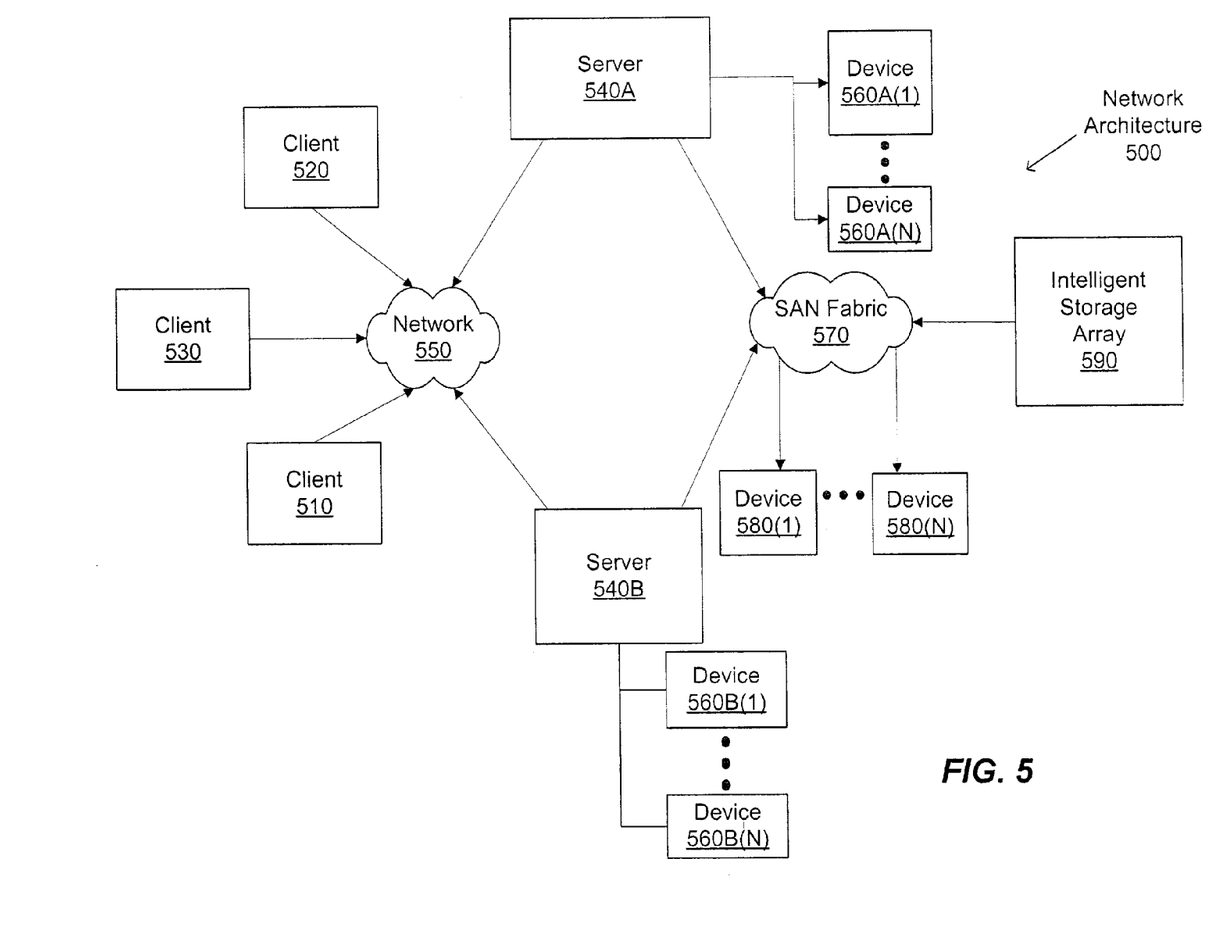
FIG. 5 is a block diagram illustrating a network environment in which data replication according to embodiments of the present invention may be used.

FIG. 5 is a block diagram depicting a network architecture 500 in which client systems 510, 520 and 530, as well as storage servers 540A and 540B (any of which can be implemented using computer system 410), are coupled to a network 550. Storage server 540A is further depicted as having storage devices 560A(1)-(N) directly attached, and storage server 540B is depicted with storage devices 560B(1)-(N) directly attached. Storage servers 540A and 540B are also connected to a SAN fabric 570, although connection to a storage area network is not required for operation of the invention. SAN fabric 570 supports access to storage devices 580(1)-(N) by storage servers 540A and 540B, and so by client systems 510, 520 and 530 via network 550. Intelligent storage array 590 is also shown as an example of a specific storage device accessible via SAN fabric 570.

With reference to computer system 410, modem 447, network interface 448 or some other method can be used to provide connectivity from each of client computer systems 510, 520 and 530 to network 550. Client systems 510, 520 and 530 are able to access information on storage server 540A or 540B using, for example, a web browser or other client software (not shown). Such a client allows client systems 510, 520 and 530 to access data hosted by storage server 540A or 540B or one of storage devices 560A(1)-(N), 560B(1)-(N), 580(1)-(N) or intelligent storage array 590. FIG. 5 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing described embodiments include components contained within other components. It is to be understood that such architectures are merely examples, and that in fact many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

What is claimed is:

1. A method comprising:
    writing a plurality of changes to data to a log on a first node, wherein
        each of the plurality of changes is written to each of a set of mirrored copies of the log, and
        at least one mirrored copy of the set of mirrored copies is constructed from a plurality of storage devices;
    when a storage device containing a portion of the at least one mirrored copy of the set of mirrored copies becomes full, discontinuing writing to the storage device, and disassociating the storage device from the set of mirrored copies, wherein the plurality of storage devices comprises the storage device;
    replicating log data from the storage device to a second node while the storage device is disassociated from the set of mirrored copies, without disturbing writing to each of the set of mirrored copies of the log, wherein each of the plurality of storage devices is a disk drive; and
    in response to the disassociating and prior to completing the replicating, selecting a second storage device from a free pool of resources, adding the second storage device to the set of mirrored copies at a location previously occupied by the storage device, and
        in response to completing the replicating, allocating the storage device to the free pool of resources.

2. The method of claim 1 wherein
    the replicating comprises reading the log data; and
    the reading does not disturb a write head writing to any of the mirrored copies of the log.

3. The method of claim 1 wherein
    the discontinuing the writing and the disassociating the storage device create a snapshot of the portion of the at least one of the mirrored copies of the log.

4. The method of claim 1 wherein
    the writing to each of the set of mirrored copies is performed in parallel.

5. The method of claim 1 further comprising:
    adding the storage device back to the set of mirrored copies subsequent to completing the replicating, wherein the adding the storage device further comprises selecting the storage device from the free pool of resources.

6. The method of claim 5 wherein
    the adding the second storage device to the set of mirrored copies prevents overwriting the portion of the at least one of the mirrored copies of the log.

7. A system comprising:
    writing means for writing a plurality of changes to data to a log on a first node, wherein
        each of the plurality of changes is written to each of a set of mirrored copies of the log, and
        at least one mirrored copy of the set of mirrored copies is constructed from a plurality of storage devices;
    a storage device containing a portion of the at least one mirrored copy of the set of mirrored copies;
    a hardware network interface to enable the system to communicate with a second node via a network;
    disassociating means for discontinuing writing to the storage device and disassociating the storage device from the set of mirrored copies, wherein the plurality of storage devices comprises the storage device;
    replicating means for replicating log data from the storage device to the second node while the storage device is disassociated from the set of mirrored copies, without disturbing writing to each of the set of mirrored copies of the log, wherein each of the plurality of storage devices is a disk drive;
    selecting means for, in response to disassociation of the storage device from the set of mirrored copies and prior to completion of replication of the log data, selecting a second storage device from a free pool of resources;
    adding means for adding the second storage device to the set of mirrored copies at a location previously occupied by the storage device; and
    allocating means for, in response to the completion of the replication of the log data, allocating the storage device to the free pool of resources.

8. The system of claim 7 further comprising:
    additional adding means for adding the storage device back to the set of mirrored copies subsequent to completion of the replication of the log data, wherein addition of the storage device back to the set of mirrored copies further comprises removal of the storage device from the free pool of resources.

9. A system comprising:
    a storage device; and
    a writing module coupled to the storage device and configured to write a plurality of changes to data to a log on a first node, wherein
        each of the plurality of changes is written to each of a set of mirrored copies of the log, at least one mirrored copy of the set of mirrored copies is constructed from a plurality of storage devices, and the storage device contains a portion of the at least one mirrored copy of the set of mirrored copies;
    a disassociating module configured to discontinue writing to a storage device and disassociate the storage device from the set of mirrored copies, when the storage device containing a portion of the at least one mirrored copy of the set of mirrored copies becomes full, wherein the plurality of storage devices comprises the storage device;
    a replicating module configured to replicate log data from the storage device to a second node while the storage device is disassociated from the set of mirrored copies, without disturbing writing to each of the set of mirrored copies of the log, wherein each of the plurality of storage devices is a disk drive;
    a selecting module configured to, in response to disassociation of the storage device and prior to completion of replication of the log data, select a second storage device from a free pool of resources; and
    an adding module configured to add the second storage device to the set of mirrored copies at a location previously occupied by the storage device; and
    an allocating module configured to, in response to completion of the replication of the log data, allocate the storage device to the free pool of resources.

10. The system of claim 9 wherein
    the replication module comprises a replication appliance.

11. The system of claim 9 further comprising:
    an additional adding module configured to add the storage device back to the set of mirrored copies subsequent to the completion of the replication, wherein the addition of the storage device back to the set of mirrored copies further comprises removal of the storage device from the free pool of resources.

12. A computer system comprising:
a processor for executing instructions; and
a memory for storing the instructions, wherein the instructions comprise:
  writing instructions configured to write a plurality of changes to data to a log on a first node, wherein each of the plurality of changes is written to each of a set of mirrored copies of the log, and at least one mirrored copy of the set of mirrored copies is constructed from a plurality of storage devices;
  disassociating instructions configured to discontinue writing to a storage device and disassociate the storage device from the set of mirrored copies, when the storage device containing a portion of the at least one mirrored copy of the set of mirrored copies becomes full, wherein the plurality of storage devices comprises the storage device;
  replicating instructions configured to replicate log data from the storage device to a second node while the storage device is disassociated from the set of mirrored copies, without disturbing writing to each of the set of mirrored copies of the log, wherein each of the plurality of storage devices is a disk drive;
  selecting instructions configured to, in response to disassociation of the storage device and prior to completion of the replication of the log data, select a second storage device from a free pool of resources;
  addition instructions configured to add the second storage device to the set of mirrored copies at a location previously occupied by the storage device; and
  allocating instructions configured to, in response to the completion of the replication of the log data, allocate the storage device to the free pool of resources.

13. The computer system of claim 12 wherein the instructions further comprise:
  additional adding instructions configured to add the storage device back to the set of mirrored copies subsequent to completion of the replication of the log data, wherein addition of the storage device back to the set of mirrored copies further comprises removal of the storage device from the free pool of resources.

14. A computer-readable storage medium comprising:
  writing instructions configured to write a plurality of changes to data to a log on a first node, wherein
    each of the plurality of changes is written to each of a set of mirrored copies of the log, and
    at least one mirrored copy of the set of mirrored copies is constructed from a plurality of storage devices;
  disassociating instructions configured to discontinue writing to a storage device and disassociate the storage device from the set of mirrored copies, when the storage device containing a portion of the at least one mirrored copy of the set of mirrored copies becomes full, wherein the plurality of storage devices comprises the storage device; application Ser. No. 10/423,291
  replicating instructions configured to replicate log data from the storage device to a second node while the storage device is disassociated from the set of mirrored copies, without disturbing writing to each of the set of mirrored copies of the log, wherein each of the plurality of storage devices is a disk drive;
  selecting instructions configured to, in response to disassociation of the storage device and prior to completion of the replication of the log data, select a second storage device from a free pool of resources;
  adding instructions configured to add the second storage device to the set of mirrored copies at a location previously occupied by the storage device; and
  allocating instructions configured to, in response to the completion of the replication of the log data, allocate the storage device to the free pool of resources.

15. The computer-readable storage medium of claim 14 further comprising:
  additional adding instructions configured to add the storage device back to the set of mirrored copies subsequent to completion of the replication of the log data, wherein the addition of the storage device further comprises removal of the storage device from the free pool of resources.

* * * * *